May 13, 1958 J. M. OLCHAWA 2,834,443
IRREVERSIBLE DRIVE
Filed March 29, 1954
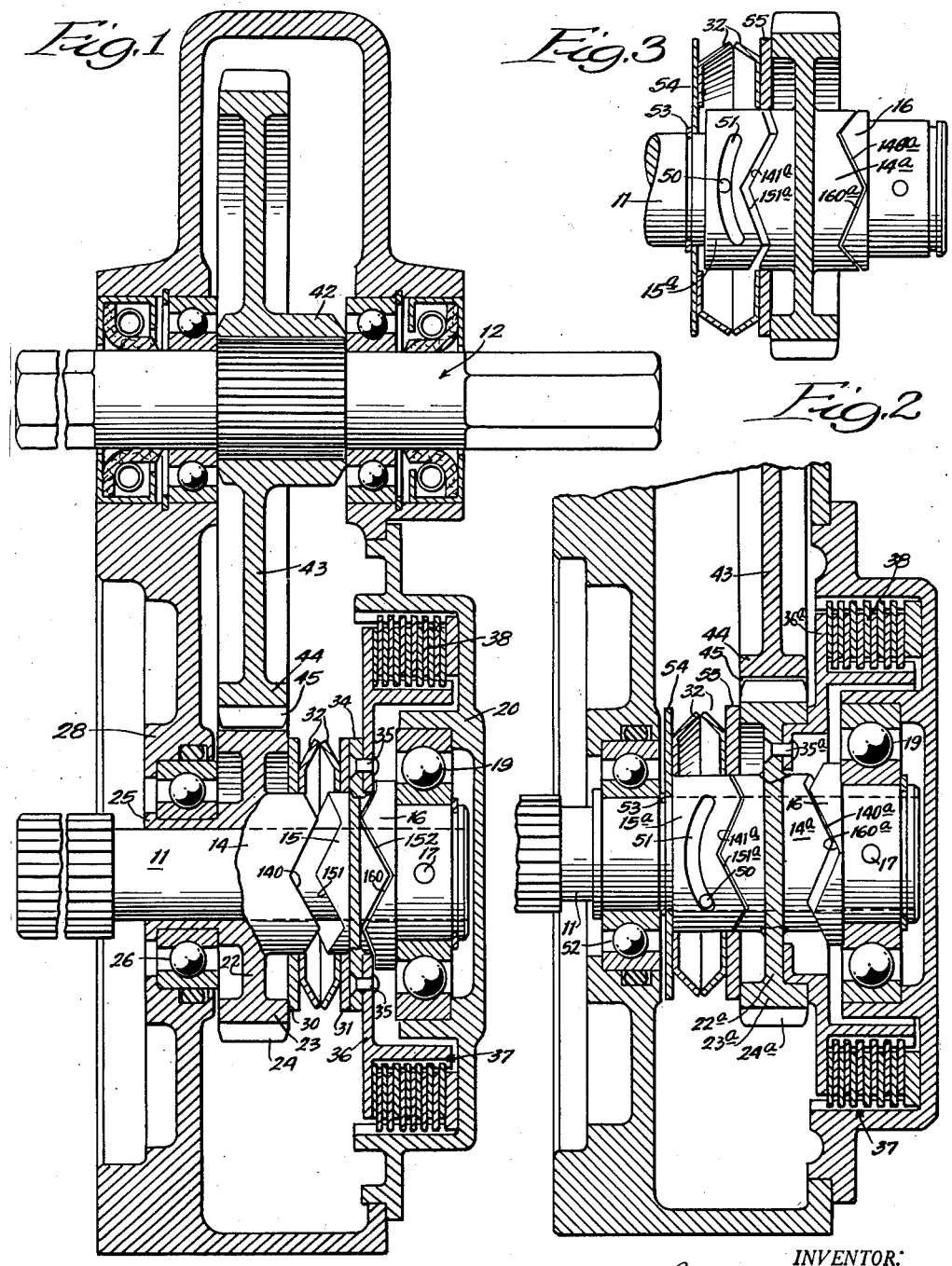
INVENTOR:
Joseph M. Olchawa,
BY
Brix Freeman & Molinare
ATTORNEYS.

United States Patent Office 2,834,443
Patented May 13, 1958

2,834,443
IRREVERSIBLE DRIVE

Joseph M. Olchawa, Chicago, Ill., assignor to Foote Bros. Gear and Machine Corporation, Chicago, Ill., a corporation of Delaware Application March 29, 1954, Serial No. 419,214

6 Claims. (Cl. 192—8)

This invention relates generally to an irreversible drive connection, and more particularly to a no-back coupling for use between an input drive shaft and an output drive shaft to permit rotation of the output shaft to be controlled solely by the rotation of the input shaft.

It is a primary object of the present invention to provide a coupling between an input drive shaft and an output drive shaft which prevents rotation of the output shaft in either direction when the input shaft is stopped.

It is another object of the present invention to provide a coupling between an input drive shaft and an output drive shaft which prevents the output shaft from overrunning the input shaft when overhauling torques are applied to the output shaft.

It is a further object of the present invention to provide a coupling between an input shaft and an output shaft, said coupling having a spring-biased floating jaw clutch element for interconnecting a driving jaw clutch element and a driven pinion element, and for effecting mechanical engagement and disengagement of a brake element.

It is another object of the present invention to provide a coupling between an input shaft and an output shaft, said coupling having a brake element mechanically engaged and disengaged by relative rotation of the input shaft with respect to an input drive pinion which provides a direct mechanical connection with the brake element, thereby preventing free rotation of the output shaft and effecting rotation of the output shaft solely in response to the input shaft.

With these and other objects in view, my invention consists in the construction, arrangement and combination of the various parts of my irreversible drive whereby the objects contemplated are obtained as hereinafter more fully set forth, pointed out in my claims and illustrated in the accompanying drawing, wherein:

Figure 1 is a vertical cross sectional view taken through a coupling constructed in accordance with the present invention and interconnecting an input drive shaft and an output drive shaft.

Figure 2 is a vertical cross sectional view similar to that of Figure 1, showing a modified form of construction.

Figure 3 is a partial sectional view of the coupling of Figure 2 showing the coupling in another operative position.

Referring now particularly to Figure 1 of the drawing, I have shown an input driven shaft 11 and an output drive shaft 12. An input drive pinion 14 is mounted on the input shaft 11 and is freely rotatable and slidable thereon. An intermediate jaw clutch element 15 is freely mounted on the shaft 11 immediately adjacent the pinion 14. A driving jaw clutch element 16 is rigidly secured to the shaft 11 by means of a connecting pin 17. The driving jaw clutch element 16 is mounted upon the shaft 11 at its terminal end and cooperates with a bearing assembly 19 to support the shaft for rotation within a jaw portion or casing 20.

The input drive pinion 14 is provided with a radially extending peripheral web 22 terminating in a peripheral flange portion 23 formed with spaced gear teeth elements 24. Tubular portion 25 of the pinion 14 extends longitudinally along the shaft 11 and cooperates to support a bearing assembly 26 within a second jaw portion or casing 28. It will be apparent that the bearing assemblies 19 and 26 serve to support the input drive shaft 11 for rotation within the coupling structure. A pair of thrust washers 30 and 31 are mounted upon adjacent portions of the pinion 14 and the jaw clutch element 15 respectively. The thrust washers 30 and 31 provide contacting surfaces for a pair of opposed Belleville springs 32.

The intermediate jaw clutch element 15 is provided with a radially extending web portion 34 which is suitably connected, as by bolt 35, to a radially extending annular flange 36. The flange 36 supports an operative contacting portion of a friction clutch or brake assembly 37. The assembly 37 is shown herein as comprising a brake disk pack 38, although the brake assembly may be of any suitable construction to meet the requirements of the particular drive loads employed.

An output drive pinion 42 is mounted upon the output drive shaft 12. The pinion 42 comprises a radially extending web portion 43 terminating in a peripheral flange 44 having spaced gear teeth elements 45. The gear teeth 45 cooperate with the gear teeth 24 to provide a drive connection between the input and output shafts.

The input drive pinion 14 is provided with a cam surface 140. The intermediate jaw clutch element is provided at one face with a cam surface 151 suitably contoured for cooperating engagement with the cam surface 140 of pinion 14. The intermediate jaw clutch element 15 is provided at its other face with a similar cam surface 152. The driving jaw clutch element is provided with a cam surface 160 which is suitably contoured for cooperating engagement with the cam surface 152 of the intermediate jaw clutch element 15.

In the operation of the construction illustrated in Figure 1 my novel coupling device prevents rotation of the output shaft in either direction when the input shaft is stopped, and also prevents the output shaft from overruning the input shaft if any overhauling torques are applied to the output shaft. The rotation of the output shaft is, therefore, completely controlled by input shaft rotation. In its normally neutral position, when the parts are at rest, the Belleville springs 32 serve to slide the floating jaw clutch element 15 axially along the input drive shaft 11 toward the right, as seen in Figure 1. This serves to mesh the cam surfaces 152 and 160 in close engagement, and to engage the mechanical brake 37. When the input shaft 11 is actuated by a suitable mechanical power drive, a torque on the input shaft is built up against the resistance of the brake 37 until the input force upon the drive shaft overcomes the force of the two Belleville springs so as to release the brake and permit relative sliding of the cam surfaces 152 and 160. In this manner the intermediate floating jaw clutch 15 is shifted axially along the input drive shaft 11 toward the left, as seen in Figure 1, so as to bring the cam surface 151 in cooperative engagement with the cam surface 140 of the input drive pinion 14.

It will be apparent that the cooperating cam surfaces of the elements 14, 15 and 16 permit a floating movement of the intermediate element 15 along the input drive shaft 11 so as to provide a unitary coupling of the three elements. In this manner, the driving jaw clutch element 16 cams with respect to the floating intermediate jaw clutch element 15 to release the brake 37 and slide the element 15 into camming engagement with the input drive pinion 14, while compressing the Belleville springs 32. The drive pinion 14 is thereby connected to and rotated by the driving element 16 for driving the output drive pinion 42 and its connected output shaft 12.

When loads on the output shaft 12 are such that the shaft tends to overrun the driving force of the input drive pinion 14, the pinion will attempt to rotate faster than the cooperating jaw clutch element 15 thereby unloading the rigid connection between the cooperating surfaces 140 and 151. The compressed springs 32 will then expand to slide the unloaded floating jaw clutch element 15 axially along the input drive shaft 11 toward the right, as seen in Figure 1. The slight spacing between the cam surfaces 152 and 160 will be closed by this shifting of the floating element 15. Such movement of the element 15 will serve to effect a mechanical engagement of the brake assembly 37 until the output load is again controlled by the input drive pinion 14.

If the output shaft 12 continues to overrun the input shaft 11 after engagement of the brake assembly 37, the spaced cam surfaces 140 and 151 will cam into tight engagement and tend to cause a still further axial shifting toward the right of the floating jaw clutch element 15. In this manner, the brake will be engaged with an increasing force as the overrunning of the output shaft 12 increases, thereby exerting an increasingly greater force to overcome the overrunning tendency.

When operating conditions require that rotation of the output shaft 12 be discontinued, and power drive of the input shaft 11 is stopped, then the intermediate jaw clutch element 15 is shifted axially along the input shaft 11 to the right, as seen in Figure 1, by the force of the Belleville springs 32. This movement of the jaw clutch 15 causes the brake assembly 37 to be engaged. In addition, any further rotation of the output shaft will cause a relative camming movement between the elements 14 and 15 thereby effecting a positive movement of the element 15 toward the right to supplement the action of the springs and effect a more positive engagement of the brake 37. This positive engagement of the jaw clutch elements restricts overrunning of the output shaft 12 to less than 60°, for the particular embodiment illustrated. This cam-play or lost motion is a function of the clearance and angles of inclination of the opposed complementary cam surfaces of the jaw clutch elements, as well as the ratio between the gears 24 and 45, and decreases as the relative cam surface clearances are decreased and the cam angles are increased, and the gear ratio is increased.

Referring now particularly to Figures 2 and 3 of the drawing, I have illustrated a modification of the construction shown in Figure 1. Identical parts of the two embodiments have been indicated by the same reference numerals, and those parts of Figures 2 and 3 which are substantially similar to corresponding parts of Figure 1 have been indicated by like numerals with the subscript "a."

The input shafts 11 and 12 (not shown) are interconnected by a no-back coupling device constructed in accordance with the present invention but differing somewhat from the arrangement of Figure 1. The embodiment of Figures 2 and 3 provides an arrangement of parts whereby the free play or lost motion of the coupling of Figure 1 is substantially eliminated, thereby providing a more positive braking action.

I have shown an input drive pinion 14a, which is mounted freely on the input drive shaft 11 and directly connected to the brake assembly 37 by means of a bolt and flange arrangement, 35a and 36a, substantially identical to the means by which the intermediate jaw clutch element of Figure 1 is operatively connected to the brake assembly.

A floating jaw clutch element 15a is mounted on the shaft 11 and restricted in axial and rotative movement with respect thereto by means of a pin 50 secured to the shaft 11 and extending outwardly therefrom into an arcuate slot 51 in the jaw clutch 15a.

A bearing assembly 52 supports the shaft 11 adjacent the jaw clutch 15a for free rotation. A pair of peripheral thrust washers 53 and 54 provide an abutment surface between the jaw clutch element 15a and the bearing assembly 52.

The intermediate driving jaw clutch element 14a or input drive pinion is provided with cam surfaces 140a and 141a at opposite faces thereof. The cam surface 141a is suitably contoured for cooperating engagement with a corresponding cam surface 151a at the adjacent face of the floating jaw clutch element 15a.

The input drive pinion 14a is provided with a radially extending web 22a terminating in a peripheral flange 23a formed with peripherally spaced teeth 24a. The gear teeth 24a cooperatively engage corresponding gear teeth 45 formed upon the peripheral flange 44 of the radially extending web 43 of the output drive pinion. In this manner, rotation of the input drive pinion 14a is transmitted to the output drive pinion for the purpose of effecting rotational drive of the output drive shaft.

A driving jaw clutch element 16 is rigidly secured by a pin 17 to the input drive shaft 11 for rotation within the supporting bearing assembly 19 in the same manner as the arrangement of parts illustrated in Figure 1. It will be apparent that the three cooperating elements 15a, 14a and 16 may provide a unitary drive assembly for rotation upon the input drive shaft 11.

In Figure 3 I have shown the elements of the coupling assembly in their cooperative relation when the device is in a neutral position. Upon actuation of the input drive shaft 11 and rotation thereof, the driving jaw clutch element 16 which is in relatively tight meshed engagement with the input drive pinion 14a will effect a camming action therewith against the force of the Belleville springs 32 so as to separate the surfaces 140a and 160a, thereby axially sliding the element 14a along the input shaft 11 toward the left. This shifting of the input drive pinion 14a effects a disengagement of the brake 37. The driving jaw clutch 16 and the drive pinion 14a maintain a positive coupling, and the cooperating output drive pinion is rotated so as to effect rotational drive of the output shaft. At the same time, the slight spacing between the cam surfaces 141a and 151a is taken up and the elements 14a and 15a mesh in relatively tight engagement.

Simultaneously with the sliding movement of the drive pinion 14a toward the left, rotation of the input drive shaft 11 effects a movement of the pin 50. Assuming that the shaft is rotating from top to bottom, as seen in Figure 3, the pin 50 moves downwardly within the slot 51, thereby effecting a sliding movement of the floating jaw clutch 15a toward the left into abutting engagement with the peripheral thrust washer 54. In the driving position, therefore, the element 15a is in its furthest position to the left, the Belleville springs 32 are compressed, the cam surfaces 141a and 151a are in relatively tight engagement, the drive pinion 14a has been shifted to the left so as to effect a disengagement of the brake, the cam surfaces 140a and 160a are slightly spaced, and the entire unitary assembly effects an integral drive coupling between the input and output shafts. This relationship of parts, when the device is in its driving position, is clearly shown in Figure 2.

In the event that the output shaft should exert an overhauling torque so as to overdrive the input drive pinion 14a, the pinion will rotate ahead of the drive shaft 11 in the direction of rotation thereof, thereby unloading the tightly engaged cam surfaces 141a and 151a, and permitting the compressed springs 32 to expand and axially shift element 14a toward the right. This movement of the drive pinion to the right will cause engagement of the brake 37.

If the drive pinion 14a continues to tend to rotate ahead of the drive shaft 11, after engagement of the brake, a camming action will be effected between the surfaces 141a and 151b, taking up the spacing resulting from the unloading, and causing the element 15a to be rotated by the element 14a. In this way, the pin 50 will move upwardly in the slot 51, thereby sliding the floating jaw clutch element 15a toward the right, away from the peripheral thrust washer 54 to a position of spaced separation therefrom, thereby exerting an axial force tending to shift element 14a still further toward the right and increasing the brake-engaging force to overcome the over-running tendency.

In this manner, any over-riding tendency which is transmitted to the drive pinion 14a results in an immediate camming movement of the pinion to effect an engagement of the brake, thereby preventing any overdrive of the shaft 11. These camming movements are effected between closely contacting surfaces so as to minimize the amount of free rotation of the input drive shaft 11. The lost motion or free play between the coupling elements is dependent upon the geometry of the adjacent cam surfaces between elements 14a and 16, and may, therefore, be kept very small.

When rotation of the output shaft 12 is to be discontinued, or when for other reasons the power drive of the input shaft 11 is stopped, the driving jaw clutch element 16 comes to rest and ceases to exert a driving force on the input drive pinion 14a. Any tendency for the output shaft 12 or the input drive pinion 14a to continue rotational movement will cause the drive pinion 14a and the floating jaw clutch element 15a, which is in tight camming engagement therewith during driving operation, to rotate ahead of the input drive shaft 11 thereby causing the pin 50 to move upwardly in the arcuate slot 51. Such movement of the pin in the slot and the additional force exerted by the compressed Belleville springs 32, will serve to effect a displacement of the element 15a toward the right, carrying the input drive pinion 14a with it in the same direction. In addition, the input drive pinion 14a will cam with respect to the adjacent surfaces 151a of element 15a and 160a of element 16 so as to return the relation of parts to the neutral position illustrated in Figure 3, wherein elements 15a and 14a are somewhat spaced and elements 14a and 16 are in relatively tight engagement. In this manner, the input drive pinion 14a is shifted toward the right with a minimum of lost movement between parts to cause a substantially immediate engagement of the brake assembly 37.

It will appear, therefore, that in the embodiment of Figures 2 and 3, wherein the output shaft is not permitted to have free rotation because of the direct attachment of the input drive pinion to the brake assembly, the arrangement of parts is such as to effect a direct and immediate braking action in the event that the drive of the input shaft is stopped or in the event that overhauling torques are applied to the output shaft. The only lost motion in the positive response obtained by this construction is, of course, dependent upon the number of teeth of the cam surfaces of the various jaw clutch elements.

Changes may be made in the construction and arrangements of the parts of my irreversible drive coupling without departing from the real spirit and purpose of my invention and it is my intention to cover by my claims any modified forms of structure or use of mechanical improvements which may be reasonably included within their scope.

I claim:

1. In an irreversible drive coupling, a rotatable driving element and a rotatable driven element, a rotatable drive pinion and a rotatable and axially slidable floating jaw clutch carried by said driving element, a driving jaw clutch rigidly secured to said driving element, said drive pinion, floating jaw clutch and driving jaw clutch coupling elements being disposed in consecutive axially adjacent relation and having cooperating cam surfaces therebetween means for limiting movement of said floating jaw clutch relative to said driving jaw clutch, whereby said floating and driving jaw clutches are connected for rotation together through said cam surfaces, said drive pinion engaging a driven pinion carried by said driven element whereby rotation of said drive pinion effects rotation of said driven element, and brake means controlled by camming movement of said floating jaw clutch, said brake means being operatively engaged upon over-riding rotation of said driven element.

2. In an irreversible drive coupling, a rotatable driving element and a rotatable driven element, a rotatable drive pinion and a rotatable and axially slidable floating jaw clutch on said driving element, a driving jaw clutch rigidly secured to said driving element, said floating jaw clutch being disposed between said drive pinion and said driving jaw clutch and providing cam surfaces for cooperation with adjacent cam surfaces of said drive pinion and driving jaw clutch, said drive pinion engaging a driven pinion carried by said driven element whereby rotation of said drive pinion effects rotation of said driven element, spring means normally biasing said floating jaw clutch axially toward said driving jaw clutch, brake means carried by said floating jaw clutch and operatively engaged when said floating jaw clutch and driving jaw clutch are in relatively close camming engagement, whereby upon rotation of said driving element said driving jaw clutch cams with said floating jaw clutch to axially slide said floating jaw clutch toward said drive pinion against the bias of said spring means to effect camming engagement therewith and to release said brake, thereby providing a drive coupling between said driving and driven elements, and upon over-riding rotation of said driven element said drive pinion being rotated relative to said floating jaw clutch to effect an unloading of the cam surfaces therebetween, said spring means operating to axially slide said floating jaw clutch toward said driving jaw clutch to engage said brake, thereby opposing said over-riding rotation of the driven element.

3. In an irreversible drive coupling, a rotatable driving element and a rotatable driven element, a drive pinion and a floating jaw clutch rotatable and axially slidable on said driving element, a driving jaw clutch rigidly secured to said driving element, said drive pinion being disposed between said floating jaw clutch and said driving jaw clutch and providing cam surfaces for cooperation with adjacent cam surfaces of said floating jaw clutch and driving jaw clutch, said drive pinion engaging a driven pinion carried by said driven element whereby rotation of said drive pinion effects rotation of said driven element, spring means normally biasing said drive pinion axially toward said driving jaw clutch, brake means carried by said drive pinion and operatively engaged when said drive pinion and said driving jaw clutch are in relatively close camming engagement, whereby upon rotation of said driving element said driving jaw clutch cams with said drive pinion to effect a shifting therebetween toward a position of relatively open camming engagement, said camming serving to axially slide said drive pinion toward said floating jaw clutch against the bias of said spring means to effect relatively close camming engagement therewith and to release said brake, while maintaining a positive drive coupling between said driving and driven elements, and upon overriding rotation of said driven element said drive pinion being rotated relative to said floating jaw clutch to effect an unloading of the cam surfaces therebetween, said spring means operating to axially slide said drive pinion toward said driving jaw clutch to engage said brake, thereby opposing said over-riding rotation of the driven element.

4. In an irreversible drive coupling, a rotatable driving element and a rotatable driven element, a drive pinion rotatable and axially slidable on said driving element, a floating jaw clutch mounting on said driving element for restricted axial and rotative movement by means of a pin and arcuate slot interconnection, a driving jaw clutch rigidly secured to said driving element, said drive pinion being disposed between said floating jaw clutch and said driving jaw clutch and providing cam surfaces for cooperation with adjacent cam surfaces of said floating jaw clutch and driving jaw clutch, said drive pinion engaging a driven pinion carried by said driven element whereby rotation of said drive pinion effects rotation of said driven element, spring means normally biasing said drive pinion axially toward said driving jaw clutch, brake means carried by said drive pinion and operatively engaged when said drive pinion and said driving jaw clutch are in relatively close camming engagement, whereby upon rotation of said driving element said driving jaw clutch cams with said drive pinion to effect a shifting therebetween toward a position of relatively open camming engagement, said camming serving to axially slide said drive pinion toward said floating jaw clutch against the bias of said spring means to effect relatively close camming engagement therewith and to release said brake, while maintaining a positive drive coupling between said driving and driven elements, and upon over-riding rotation of said driven element said floating jaw clutch moves axially toward said drive pinion due to relative rotation of said pin in said arcuate slot and the force of said spring means to effect a shifting of said drive pinion toward a position of relatively close camming engagement with said driving jaw clutch and to engage said brake, thereby opposing said over-riding rotation of the driven element.

5. In an irreversible drive coupling, a rotatable driving element and a rotatable driven element, a rotatable drive pinion and a rotatable and axially slidable floating jaw clutch on said driving element, a driving jaw clutch rigidly secured to said driving element, said floating jaw clutch being disposed between said drive pinion and said driving jaw clutch and providing cam surfaces for co-operation with adjacent cam surfaces of said drive pinion and driving jaw clutch, said drive pinion engaging a driven pinion carried by said driven element whereby rotation of said drive pinion effects rotation of said driven element, brake means carried by said floating jaw clutch and operatively engaged when said floating jaw clutch and driving jaw clutch are in relatively close camming engagement, whereby upon rotation of said driving element said driving jaw clutch cams with said floating jaw clutch to axially slide said floating jaw clutch toward said drive pinion to effect camming engagement therewith and to release said brake, thereby providing a drive coupling between said driving and driven elements, and upon over-riding rotation of said driven element said drive pinion being rotated relative to said floating jaw clutch to effect an unloading of the cam surfaces therebetween and to axially slide said floating jaw clutch toward said driving jaw clutch to engage said brake, thereby opposing said over-riding rotation of the driven element.

6. In an irreversible drive coupling, a rotatable driving element and a rotatable driven element, a drive pinion rotatable and axially slidable on said driving element, a floating jaw clutch mounting on said driving element for restricted axial and rotative movement by means of a pin and arcuate slot interconnection, a driving jaw clutch rigidly secured to said driving element, said drive pinion being disposed between said floating jaw clutch and said driving jaw clutch and providing cam surfaces for co-operation with adjacent cam surfaces of said floating jaw clutch and driving jaw clutch, said drive pinion engaging a driven pinion carried by said driven element whereby rotation of said drive pinion effects rotation of said driven element, brake means carried by said drive pinion and operatively engaged when said drive pinion and said driving jaw clutch are in relatively close camming engagement, whereby upon rotation of said driving element said driving jaw clutch cams with said drive pinion to effect a shifting therebetween toward a position of relatively open camming engagement, said camming serving to axially slide said drive pinion toward said floating jaw clutch to effect relatively close camming engagement therewith and to release said brake, while maintaining a positive drive coupling between said driving and driven elements, and upon over-riding rotation of said driven element said floating jaw clutch moves axially toward said drive pinion due to relative rotation of said pin in said arcuate slot to effect a shifting of said drive pinion toward a position of relatively close camming engagement with said driving jaw clutch and to engage said brake, thereby opposing said over-riding rotation of the driven element.

References Cited in the file of this patent

UNITED STATES PATENTS

| | | |
|---|---|---|
| 1,770,087 | Quick et al. | July 8, 1930 |
| 2,172,440 | Edmondson | Sept. 12, 1939 |
| 2,464,589 | Landahl | Mar. 15, 1949 |
| 2,659,466 | Ochtman | Nov. 17, 1953 |

FOREIGN PATENTS

| | | |
|---|---|---|
| 630,232 | Germany | May 23, 1936 |